Aug. 14, 1945. R. E. SIEVERT 2,382,030
HAND CULTIVATOR
Filed March 23, 1944 2 Sheets-Sheet 2

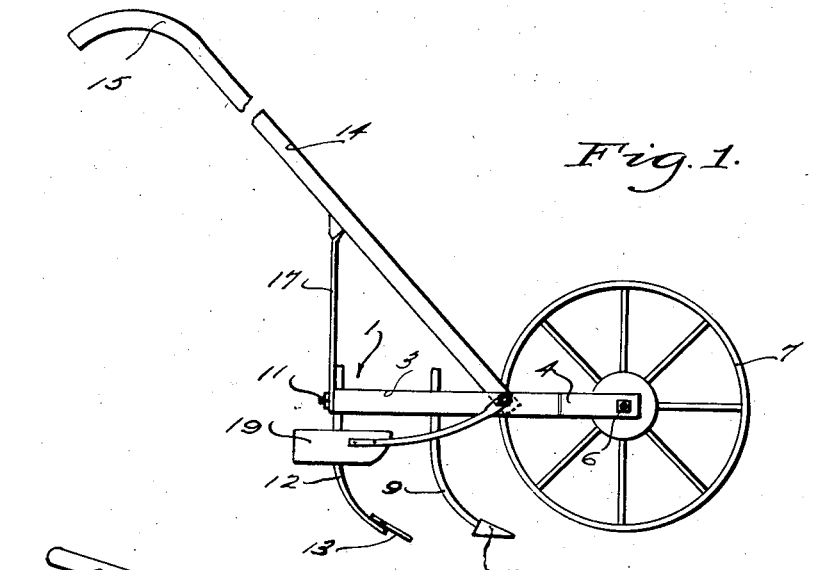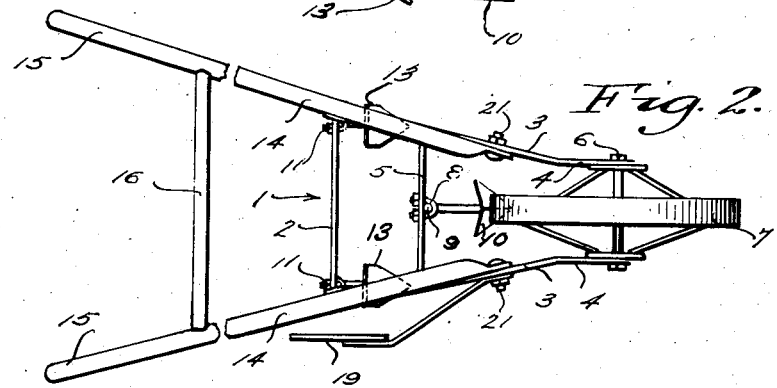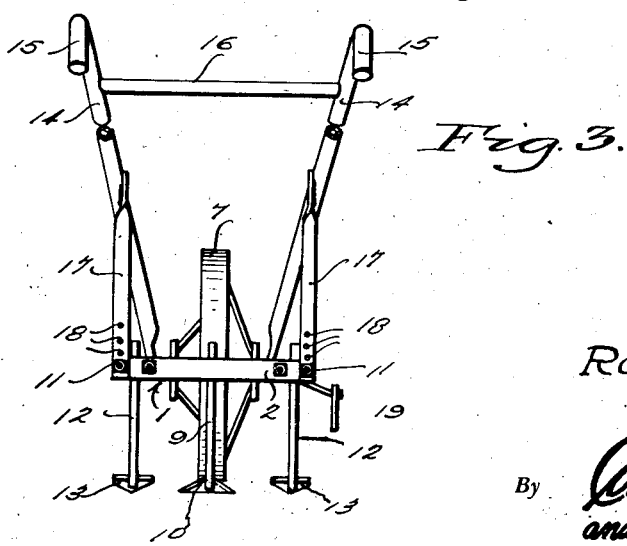

Inventor
Roy E. Sievert,

By *Clarence A. O'Brien and Harvey B. Jacobson*
Attorneys

Patented Aug. 14, 1945

2,382,030

UNITED STATES PATENT OFFICE 2,382,030

HAND CULTIVATOR

Roy E. Sievert, Morris, Minn.

Application March 23, 1944, Serial No. 527,807

1 Claim. (Cl. 97—59)

The present invention relates to new and useful improvements in hand cultivators, and has for one of its important objects to provide an implement of this character comprising a novel construction and arrangement whereby the shovels may readily be caused to function at any desired depth.

Another important object of the invention is to provide, in a manner as hereinafter set forth, a hand cultivator of the character described wherein the handles may be conveniently adjusted to suit the operator.

Other objects of the invention are to provide a hand cultivator which will be comparatively simple in construction, strong, durable, efficient in operation, compact, light in weight, and which may be manufactured at low cost.

All of the foregoing, and still further objects and advantages of the invention, will become apparent from a study of the following specification, taken in connection with the accompanying drawings wherein like characters of reference designate corresponding parts throughout the several views, and wherein:

Figure 1 is a view in side elevation of a hand cultivator constructed in accordance with the present invention.

Figure 2 is a top plan view thereof.

Figure 3 is a rear elevational view of the device.

Figure 4:
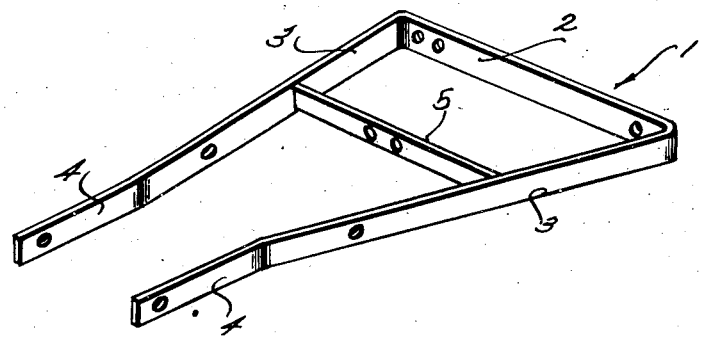
Figure 4 is a perspective view of the frame.

Referring now to the drawings in detail, it will be seen that the embodiment of the invention which has been illustrated comprises a frame of suitable metal which is designated generally by reference numeral 1. The frame 1 includes a cross member 2 from the ends of which forwardly converging legs 3 extend, said legs terminating in spaced, parallel forward end portions 4. Extending between the legs 3 of the frame 1 at an intermediate point is a brace 5.

A suitable axle 6 extends between the forward end portions 4 of the frame 1. Journaled on the axle 6 is a supporting wheel 7 for the implement.

Secured by a U-bolt 8 on the brace 5 of the frame 1 and depending from said brace is a shank 9. A front shovel 10 is welded or otherwise suitably secured on the lower end portion of the shank 9. The shovel 10 is transversely elongated and substantially V-shaped in cross section.

Figure 5:
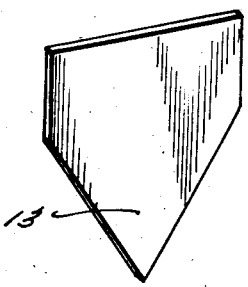
Figure 5 is a detail view in perspective of one of the rear or side shovels.
Figure 6:
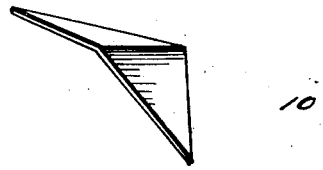
Figure 6 is a detail view in perspective of the front or center shovel.

Secured by U-bolts 11 on the cross member 2 of the frame 1, adjacent the legs 3 of said frame, are depending shanks 12. Welded or otherwise suitably secured on the lower end portions of the shanks 12 are rear shovels 13. The shovels 13 are flat and of substantially the shape shown to advantage in Figure 5 of the drawings.

Pivotally secured by bolts 21 for vertical swinging adjustment on the legs 3 of the frame 1 at a point in transverse alignment with the back portion of the wheel 7 is a pair of handles 14. At their rear ends the handles 14 terminate in grips 15. A brace 16 extends between the handles 14 adjacent the grips 15.

Mounted on the handles 14 at an intermediate point and depending therefrom is a pair of metallic braces 17. The lower end portions of the braces 17 are adjustably connected to the member 2 of the frame 1. Toward this end, the lower end portions of the braces 17 have formed therein spaced openings 18 (see Fig. 3) in which the outer legs of the U-bolts 11 are selectively engageable. Thus, the U-bolts 11 constitute common means for securing the shanks 12 and the braces 17 to the frame 1.

It is thought that the operation of the cultivator will be readily apparent from a consideration of the foregoing. Briefly, the operator grasps the grips 15 and pushes the implement forward on the wheel 7 in the usual manner. The front shovel 10 throws the soil laterally into the path of the rear shovels 13. Also, the front shovel 10 may be caused to function substantially in the manner of a subsoiler. By raising or lowering the braces 17 on the frame 1, the handles 14 may be readily adjusted to suit the operator. One of the handle-securing bolts 21 also pivotally connects a shield 19 to the frame 1. The shield 19 is adapted to travel adjacent the rear shovel 13 on one side of the implement for permitting the soil to be cultivated close to growing plants without injuring said plants.

It is believed that the many advantages of a hand cultivator constructed in accordance with the present invention will be readily understood, and although a preferred embodiment of the device is as illustrated and described, it is to be understood that changes in the details of construction may be resorted to which will fall within the scope of the invention as claimed.

What is claimed is:

A hand cultivator of the character described comprising a horizontal, substantially U-shaped metallic frame including a cross member and converging legs extending forwardly from the ends of the cross member, said legs terminating in spaced, parallel forward end portions, a wheel journaled between said forward end portions of the legs, a brace extending between intermediate portions of the legs, shanks depending from the cross member of the frame, a pair of handles pivotally secured for vertical swinging adjustment to the frame legs at a point substantially in transverse alignment with the rear portion of the wheel, braces depending from intermediate portions of the handles and having spaced openings in their lower end portions, U-bolts securing the shanks to the cross member of the frame, said U-bolts being engageable selectively in the openings for adjustably connecting the second-named braces to the cross member of the frame, a shank depending from the first-named brace, shovels mounted on the first and second-named shanks, and a U-bolt engageable in apertures in said first-named brace securing said second-named shank thereto.

ROY E. SIEVERT.